United States Patent
Wang et al.

(10) Patent No.: US 9,819,890 B2
(45) Date of Patent: Nov. 14, 2017

(54) READOUT CIRCUITRY TO MITIGATE COLUMN FIXED PATTERN NOISE OF AN IMAGE SENSOR

(71) Applicant: OMNIVISION TECHNOLOGIES, INC., Santa Clara, CA (US)

(72) Inventors: Rui Wang, San Jose, CA (US); Le Huang, San Jose, CA (US); Tianjia Sun, San Jose, CA (US); Tiejun Dai, Santa Clara, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 0 days.

(21) Appl. No.: 14/828,404

(22) Filed: Aug. 17, 2015

(65) Prior Publication Data

US 2017/0054931 A1  Feb. 23, 2017

(51) Int. Cl.
*H04N 5/378* (2011.01)
*H04N 5/365* (2011.01)

(52) U.S. Cl.
CPC ............. *H04N 5/378* (2013.01); *H04N 5/365* (2013.01)

(58) Field of Classification Search
CPC ...... H04N 5/361; H04N 5/378; H04N 5/3575; H04N 5/335; H04N 3/155; H04N 3/1537; H04N 3/1575; H04N 5/365; H04N 5/3765; H01L 27/14831
See application file for complete search history.

(56) References Cited

U.S. PATENT DOCUMENTS

| | | | |
|---|---|---|---|
| 6,885,331 B2 * | 4/2005 | Krymski | H03K 4/026 341/155 |
| 7,268,814 B1 * | 9/2007 | Pain | H04N 5/3575 348/294 |
| 8,059,172 B2 * | 11/2011 | Kondo | H04N 5/217 348/241 |
| 8,405,747 B2 | 3/2013 | Mo et al. | |
| 8,411,188 B2 * | 4/2013 | Iida | H03G 5/28 250/208.1 |
| 8,508,629 B2 | 8/2013 | Mo et al. | |
| 8,643,750 B2 | 2/2014 | Mo et al. | |
| 8,730,081 B2 | 5/2014 | Yang et al. | |
| 8,730,364 B2 | 5/2014 | Dai et al. | |
| 8,872,088 B2 | 10/2014 | Zhang et al. | |
| 8,994,832 B1 | 3/2015 | Yang et al. | |
| 2006/0097902 A1 * | 5/2006 | Muramatsu | H03K 5/2481 341/155 |

(Continued)

*Primary Examiner* — Luong T Nguyen
(74) *Attorney, Agent, or Firm* — Christensen O'Connor Johnson Kindness PLLC (57) ABSTRACT

Techniques and mechanisms to mitigate fixed pattern noise in image sensor data. In an embodiment, readout circuitry includes an adaptive analog-to-digital converter (ADC) comprising a differential amplifier and a feedback path coupled across the differential amplifier, where the ADC is to receive a ramp signal, a control signal associated with a transition rate of the ramp signal, and an analog signal generated by one or more pixels. In another embodiment, the feedback path and/or one or more other circuit elements coupled to the differential amplifier are configured, based on the control signal, to provide one of multiple loop gains with the differential amplifier. The ADC provides a digital output to determine a comparison based on the ramp signal and the analog signal.

17 Claims, 6 Drawing Sheets

(56) References Cited

U.S. PATENT DOCUMENTS

| | | | |
|---|---|---|---|
| 2006/0170795 A1* | 8/2006 | Higuchi | H04N 5/3575 |
| | | | 348/241 |
| 2007/0046513 A1* | 3/2007 | Ham | H03M 1/58 |
| | | | 341/118 |
| 2010/0253822 A1* | 10/2010 | Ebiko | H01L 27/14609 |
| | | | 348/294 |
| 2012/0212657 A1 | 8/2012 | Mo et al. | |
| 2013/0120619 A1 | 5/2013 | Mo et al. | |
| 2013/0201361 A1* | 8/2013 | Yang | H04N 5/23229 |
| | | | 348/222.1 |
| 2014/0008515 A1 | 1/2014 | Wang et al. | |
| 2014/0048685 A1 | 2/2014 | Zhang et al. | |
| 2014/0184844 A1* | 7/2014 | Muto | H04N 5/355 |
| | | | 348/222.1 |
| 2014/0225760 A1 | 8/2014 | Yang | |
| 2014/0226050 A1 | 8/2014 | Yang et al. | |
| 2015/0264284 A1* | 9/2015 | Yoo | H04N 5/363 |
| | | | 250/208.1 |
| 2016/0314334 A1* | 10/2016 | He | G06K 9/0012 |

* cited by examiner

READOUT CIRCUITRY TO MITIGATE COLUMN FIXED PATTERN NOISE OF AN IMAGE SENSOR

BACKGROUND

1. Technical Field

This disclosure relates generally to analog-to-digital signal conversion and in particular, but not exclusively, to image sensor readout circuitry.

2. Background Art

Image sensors have become ubiquitous. They are widely used in digital still cameras, cellular phones, security cameras, as well as, medical, automobile, and other applications. The technology used to manufacture image sensors, and in particular, complementary metal oxide semiconductor (CMOS) image sensors, has continued to advance at a great pace. For example, the demands of higher resolution, high quality images and lower power consumption have encouraged the further miniaturization and integration of these CMOS image sensors. However, fixed pattern noise—or "FPN"—is a known issue for CMOS (and other) image sensors. FPN is a spatial variation in pixel outputs under uniform illumination due to device and interconnect mismatches within an image sensor. FPN may present itself in a resultant image as some pattern of brighter or dimmer pixels occurring with images taken under the same temperature and exposure. Column FPN (CFPN) is a common name for a specific type of FPN that is due to the variation in the amplifier or analog-to-digital converter (ADC) circuitry that is coupled along a pixel array "column" (which, in this context, refers to a direction along which an output bitline is shared by multiple pixels). CFPN present itself in a resultant image as some pattern of brighter or dimmer columns occurring with images taken under the same temperature and exposure.

Conventional methods of reducing FPN in image sensors include correlated double sampling (CDS), in which an analog reference signal (or black signal level) is amplified and then sampled before resetting a pixel cell. During subsequent image acquisition, the reset pixel cell is exposed to light and charged to produce an analog image signal. The analog image signal is amplified, then sampled and compared with the sampled reference signal (i.e., black signal is subtracted from the image signal) to arrive at a final value (i.e., the resultant image signal).

Amplification of such analog reference and image signals is performed with what is commonly referred to as column gain amplifier circuitry, which in conventional image sensors then provides an amplified analog output to analog-to-digital circuitry for further processing. CFPN caused by the variations in an ADC for a pixel array column is suppressed by the column gain amplifier by a factor of the column gain. As the demand for small form factor and/or low cost image sensor devices continues to grow there is a corresponding need for efficient solutions capable of mitigating CFPN in a variety of image sensing conditions without the cost of a column gain amplifier. Incremental improvements to CFPN mitigation are thus expected to become increasingly valuable for successive generations of image sensing technology.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and/or mechanisms to mitigate column fixed pattern noise in image sensor data—e.g., independent of any column gain amplifier circuitry. Readout circuitry according to one embodiment includes an analog-to-digital converter (ADC) which is adaptive to accommodate different levels of gain that, for example, each correspond to a respective image sensing condition. For example, such an ADC may include a differential amplifier and a feedback path coupled across the differential amplifier, where the ADC is to receive a ramp signal, a control signal associated with a transition rate of the ramp signal, and an analog signal generated by one or more pixels. The control signal (and/or the transition rate of the ramp signal) may be based, for example, on a detected lighting condition during generation of the analog signal. In an embodiment, the feedback path and/or one or more other circuit elements coupled to the differential amplifier may be configured, with the control signal, for any of multiple loop gains to be provided with the differential amplifier. The ADC may allow for processing of image sensor data that is independent of any preceding analog signal amplification by column gain amplifier circuitry.

Figure 1:
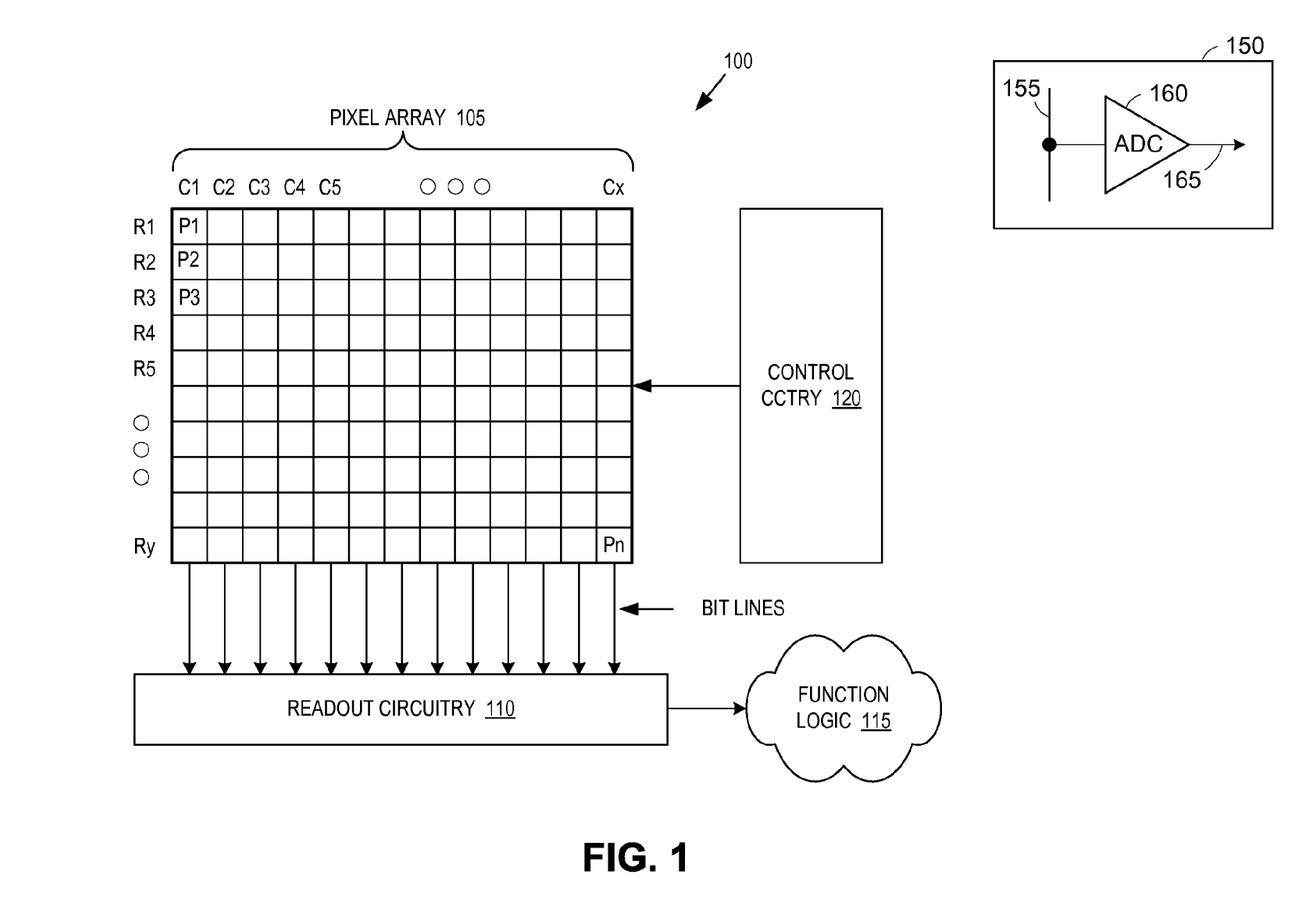
FIG. 1 is a function block diagram illustrating an image sensor, in accordance with one embodiment.

FIG. 1 is a block diagram illustrating imaging system 100, in accordance with an embodiment of the invention. The illustrated embodiment of imaging system 100 includes pixel array 105, readout circuitry 110, function logic 115, and control circuitry 120.

Pixel array 105 is a two-dimensional ("2D") array of imaging sensor cells or pixel cells (e.g., pixels P1, P2, ..., Pn). As discussed herein, various alternate embodiments may be practiced with an array of imaging elements, where each imaging elements includes one or more pixels. Image data collected from such an imaging element may include an aggregation of respective outputs from all pixels in the imaging element or, alternatively, of respective outputs from only a select one or more pixels in the imaging element.

In one embodiment, pixel array 105 includes is a complementary metal-oxide-semiconductor ("CMOS") imaging pixel. Pixel array 105 may be implemented as a frontside illuminated image sensor or a backside illuminated image sensor. As illustrated, each pixel is arranged into a row (e.g., rows R1 to Ry) and a column (e.g., column C1 to Cx) to acquire image data of a person, place, or object, which can then be used to render an image of the person, place, or object.

After each pixel has acquired its image data or image charge, the image data is readout by readout circuitry 110 and transferred to function logic 115. Readout circuitry 110 may include amplification circuitry, analog-to-digital ("ADC") conversion circuitry, or otherwise. Function logic 115 may simply store the image data or even manipulate the image data by applying post image effects (e.g., crop, rotate, remove red eye, adjust brightness, adjust contrast, or otherwise). In one embodiment, readout circuitry 110 may readout a row of image data at a time along readout column lines (illustrated as generic bit lines) or may readout the image data using a variety of other techniques (not illustrated), such as a serial readout, column readout along readout row lines, or a full parallel readout of all pixels simultaneously.

Control circuitry 120 is coupled to pixel array 105 and includes logic for controlling an operational characteristic of pixel array 105. For example, reset, row select, and/or transfer signals may be generated by control circuitry 120, as discussed below. Additionally, gain control signals, as discussed below, may also be generated by control circuitry 120 (or control logic integrated with readout circuitry 110). In one embodiment, control circuitry 120 may include photosensitive circuitry to measure the intensity of light impinging upon pixel array 105 and adjust the control signals accordingly.

As illustrated in inset 150 of FIG. 1, readout circuitry according to some embodiments (e.g., readout circuitry 110) may include analog-to-digital converter (ADC) 160 coupled to receive an analog signal directly from bitline 155 of a pixel array. Such readout circuitry may omit a column gain amplifier or other such circuitry to perform analog amplification of image sensor data prior to signal conversion by ADC 160. In the example shown, ADC 160 generates digital signal 165 that represents image sensor information received via bit line 155 or is otherwise used to generate digital data representing such image sensor information. Such generation of digital signal 165 may be based on one of multiple configurable levels of gain that may be provided by ADC 160.

Figure 2:
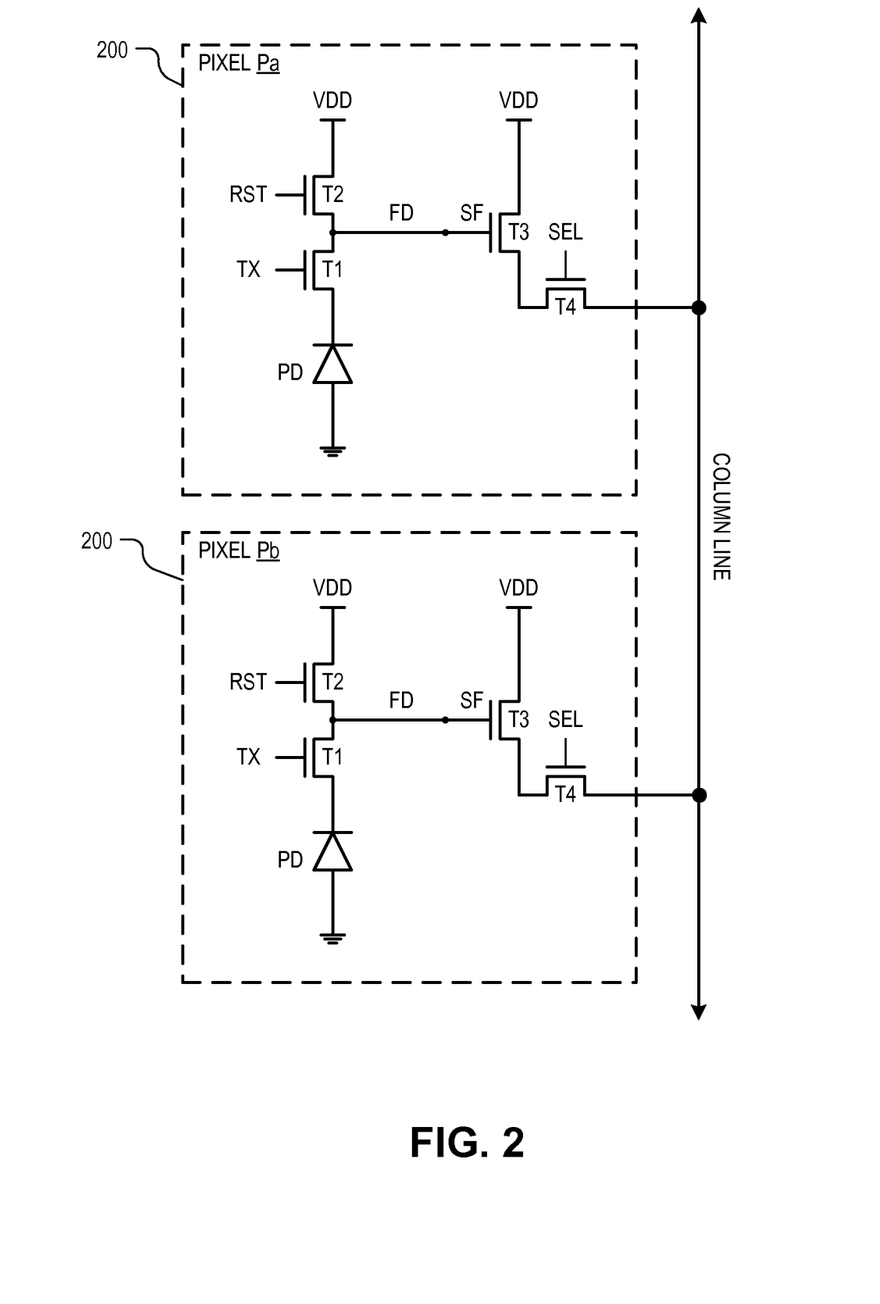
FIG. 2 is a circuit diagram illustrating pixel circuitry for two four-transistor ("4T") pixels within a pixel array in accordance with one embodiment.

FIG. 2 is a circuit diagram illustrating pixel circuitry of two four-transistor ("4T") pixel cells Pa and Pb (collectively pixel cells 200) within an image sensor array. Pixel circuitry 200 is one possible pixel circuitry architecture for implementing each pixel within pixel array 105 of FIG. 1, but it should be appreciated that embodiments of the present invention are not limited to 4T pixel architectures; rather, one of ordinary skill in the art having the benefit of the instant disclosure will understand that the present teachings are also applicable to 3T designs, 5T designs, and various other pixel architectures.

Pixel cells Pa and Pb are arranged in two rows and one column and time share a single readout column line. Each pixel cell 200 includes a photodiode PD, a transfer transistor T1, a reset transistor T2, a source-follower ("SF") or amplifier ("AMP") transistor T3, and a row select ("RS") transistor T4.

During operation, transfer transistor T1 receives a transfer signal TX, which transfers the charge accumulated in photodiode PD to a FD node. Reset transistor T2 is coupled between a power rail VDD and the FD node to reset the pixel (e.g., discharge or charge the FD and the PD to a preset voltage) under control of a reset signal RST. The FD node is coupled to control the gate of AMP transistor T3. AMP transistor T3 is coupled between the power rail VDD and RS transistor T4. AMP transistor T3 operates as a source-follower providing a high impedance connection to the FD node. Finally, RS transistor T4 selectively couples the output of the pixel circuitry to the readout column line under control of a signal SEL.

In normal operation, the photodiode PD and the FD node are reset by temporarily asserting the reset signal RST and the transfer signal TX. The image accumulation window (exposure period) is commenced by de-asserting the transfer signal TX and permitting incident light to charge the photodiode PD. As photo-generated electrons accumulate on the photodiode PD, its voltage decreases (electrons are negative charge carriers). The voltage or charge on photodiode PD is indicative of the intensity of the light incident on the photodiode PD during the exposure period. At the end of the exposure period, the reset signal RST is de-asserted to isolate the FD node and the transfer signal TX is asserted to couple the photodiode to the FD node and hence the gate of AMP transistor T3. The charge transfer causes the voltage of the FD node to drop by an amount of proportional to photogenerated electrons accumulated on the photodiode PD during the exposure period. This second voltage biases AMP transistor T3, which is coupled to the readout column line when the signal SEL is asserted on RS transistor T4. Data may be readout from the pixel cell onto the column line as an analog signal. In one embodiment, the TX signal, the RST signal, and the SEL signal are generated by control circuitry 120.

Figure 3A:
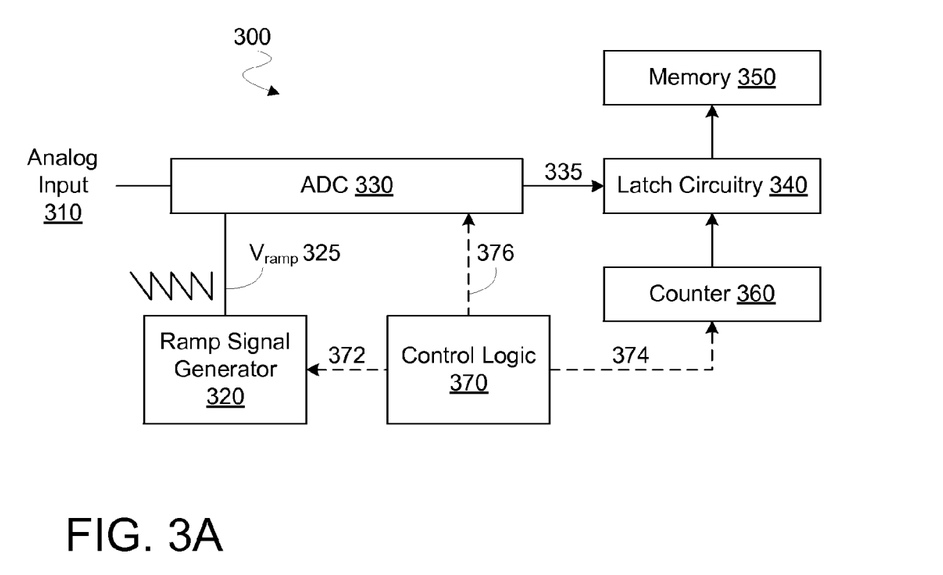
FIG. 3A is a functional block diagram illustrating elements of a readout circuitry to mitigate fixed pattern noise according to an embodiment.

FIG. 3A illustrates elements of readout circuitry 300 to process image sensor data according to an embodiment. Readout circuitry 300 may include some or all of the features of readout circuitry 110, for example.

Readout circuitry 300 may comprise ADC 330 to output digital signal 335 based on analog input 310 generated, for example, by pixel array 105, by the pixel cells of FIG. 2 or by any of a variety of other image sensor circuitry. Generation of digital signal 335 may be further based on one or more control signals e.g., including control signals 372, 376 provided by control logic 370 that is included in, or coupled to, readout circuitry 300. In some embodiments, digital signal 335 is generated further based on ramp signal $V_{ramp}$ 325 received from ramp signal generator 320 included in, or coupled to, readout circuitry 300. The ramp signal $V_{ramp}$ 325 may be used as a basis for performing a comparison to evaluate a level represented by analog signal 310.

Figure 3B:
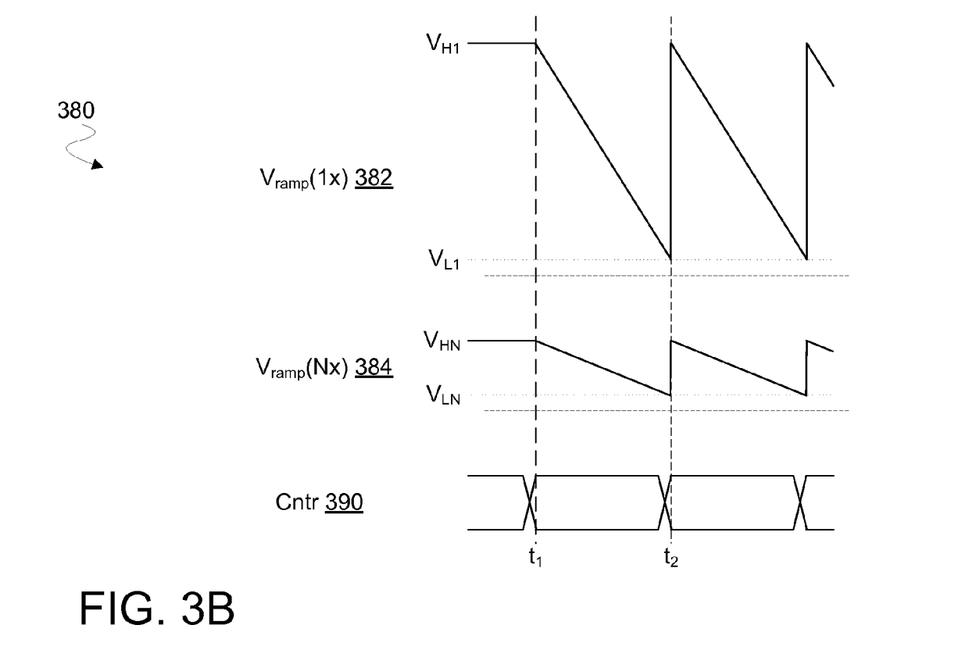
FIG. 3B shows timing diagrams illustrating signal exchanges performed by readout circuitry according to an embodiment.

As used herein, "ramp signal" refers to a signal that, during some period of time, transitions linearly between a first level (e.g., of voltage or current) and a second such level. To illustrate, FIG. 3B shows timing diagrams 380 for signal exchanges that may be performed, according to an embodiment, by circuit logic such as that of readout circuitry 300. One such signal, $V_{ramp}(1\times)$ 382, represents a ramp signal that may be provided to an ADC—as $V_{ramp}$ 325, for example—when that ADC is configured for some relatively small (e.g., 1×) level of gain. Another range for such a ramp signal, as illustrated by $V_{ramp}(N\times)$ 384, may be provided when that ADC is instead configured for a relatively large (e.g., Nx, where N is greater than 1) level of gain. In one illustrative embodiment where N is equal to 8, $V_{ramp}(1\times)$ 382 transitions through a range between voltage levels $V_{H1}$, $V_{L1}$, where $V_{ramp}(N\times)$ 384 transitions through one-eighth of that range between voltage levels $V_{HN}$, $V_{LN}$. For example, $V_{H1}$ and $V_{HN}$ may be 5V and 0.625V, respectively, where $V_{L1}$ and $V_{L1}$ are both a 0V (e.g., a ground potential). However, the particular values, ranges, etc. of a ramp signal for various operations of an ADC may vary significantly in different embodiments, according to implementation-specific details. Although $V_{ramp}(1\times)$ 382 and $V_{ramp}(N\times)$ 384 are shown as being cyclical saw tooth signals with gradual high-to-low transitions, ramp signals according to other embodiments are not limited in these regards.

Digital signal 330 may represent image sensor information generated by analog input 310 and/or may be provided to otherwise determine such image sensor information. In one embodiment, digital signal 335 represents or may otherwise be provided to determine a comparison based on analog input 310 and $V_{ramp}$ 325. For example, a transition of digital signal 335 between a logical high state and a logical low state may coincide with or otherwise represent a level (of charge, voltage, or the like) of $V_{ramp}$ 325, or a level otherwise based on $V_{ramp}$ 325, being equal to—or, in other embodiments, transitioning above, or alternatively below—another such level that is based on analog input 310. A result of the comparison, digital signal 335 may be provided to signal the storing of a value to a memory—e.g., where the value corresponds to a level of sensed light represented by analog input 310.

By way of illustration and not limitation, readout circuitry 300 may further include or couple to a counter 360 that is to perform a predetermined countdown (or count up) sequence. The counter sequence may be synchronized with a transition of $V_{ramp}$ 325. For example, as represented by the counter cycles Cntr 390 of FIG. 3B, a transition of a ramp signal may be synchronized with an end of a count sequence at a time $t_1$ and with an end of the count sequence at another time $t_2$. In one embodiment, control signal 374 (e.g., the same as control signal 372) from control logic 370 may provide for such synchronization. The count sequence of Cntr 390 may be repeated cyclically e.g., where repeated count cycles coincide with respective transitions of a ramp signal.

In one embodiment, digital signal 335 signals that a current value of counter 360 is to be stored as image sensor information representative of that in analog input 310. For example, readout circuitry may further include or couple to latch circuitry 340 and memory 350, where a transition of digital signal 335 between logical states is to cause latch circuitry 340 to latch a current count value for storage to memory 350. The variations in the transition time of digital signal 335 will cause latch circuitry 340 to latch a different count value, which results in CFPN on image. To mitigate CFPN, ADC 330 should be able to output a fast transition digital signal 335. For a fast changing $V_{ramp}$ (1×) 382, or a slow changing $V_{ramp}$ (Nx) 384, the output digital signal 335 will have different transition times. By adaptively configuring the ADC 330 to minimize the transition time of output digital signal 335 based on the changing rate of input $V_{ramp}$ 325, the CFPN is mitigated under all conditions.

Figure 4:
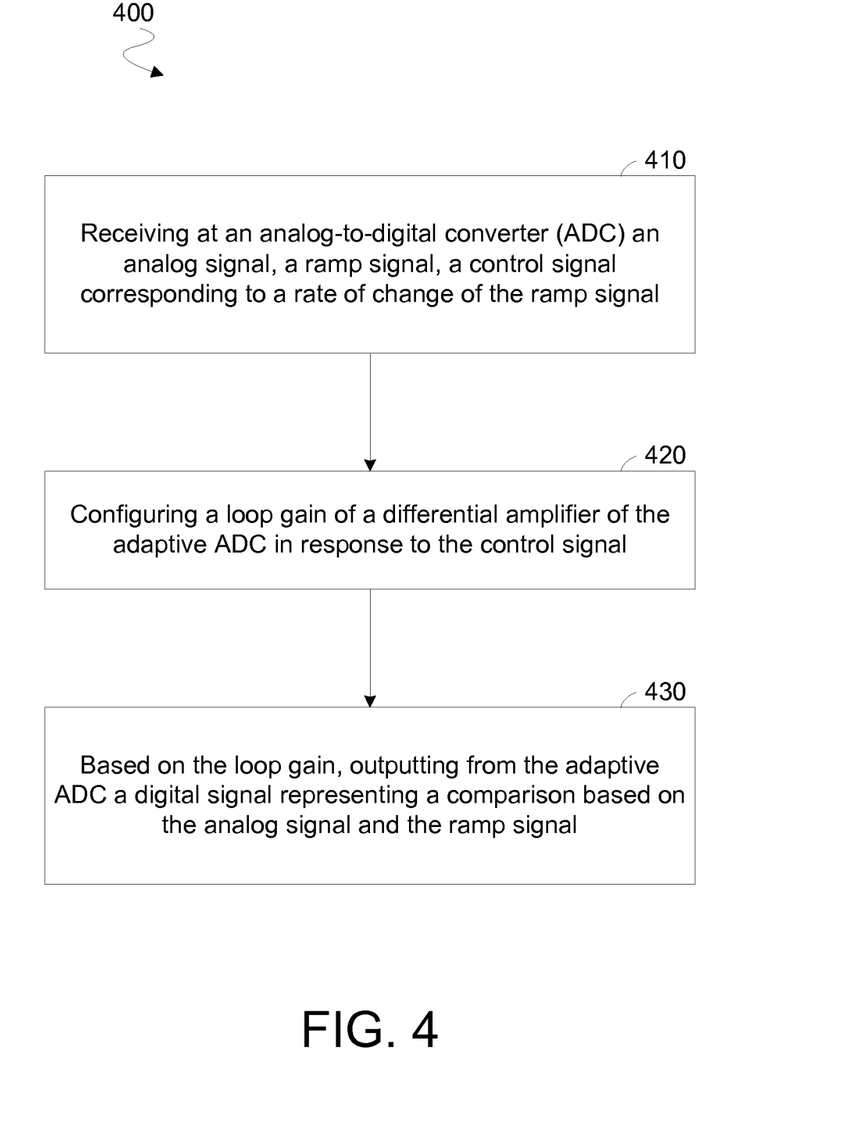
FIG. 4 is a flow diagram illustrating elements of a method to operate readout circuitry according to an embodiment.

FIG. 4 illustrates elements of method 400 for operating readout circuitry to process image sensor information according to an embodiment. Method 400 may be performed by an image sensor having some or all of the features of imaging system 100 e.g., where method 400 is performed by readout circuitry 110 or readout circuitry 300. To illustrate certain features of various embodiments, some operations of method 400 are described herein with reference to FIG. 5, which illustrates elements of ADC 500 (e.g., ADC 300) according to one embodiment. However, such operations may additionally or alternatively be performed with any of a variety of other analog-to-digital conversion circuitry, according to different embodiments, having features variously set forth herein.

Method 400 may include, at 410, receiving at an ADC an analog signal, a ramp signal, a control signal corresponding to a rate of change of the ramp signal. In one embodiment, the analog signal, ramp signal and control signal include, respectively, analog input 310, $V_{ramp}$ 325 and control signal 376. In the embodiment illustrated by FIG. 5, ADC 500 is coupled receive an input via analog signal line 505, ramp signal $V_{ramp1}$ and control signal 540. Analog signal line 505 may provide to ADC 500 a signal generated by a pixel array (not shown) independent of any analog amplification after an output from the pixel array. For example, a pixel of the pixel array may output the signal to a bit line, where ADC 500 is coupled to the bit line directly, or otherwise via a signal path that is independent of (e.g., that omits) any column gain amplifier of the readout circuitry. Capacitor $C_{bit1}$ is connected between the bit line or analog signal 505 and an input of the differential amplifier 510. The presence of capacitor $C_{bit1}$ may allow the input of differential amplifier 510 follow a signal at analog signal line 505.

Figure 5:
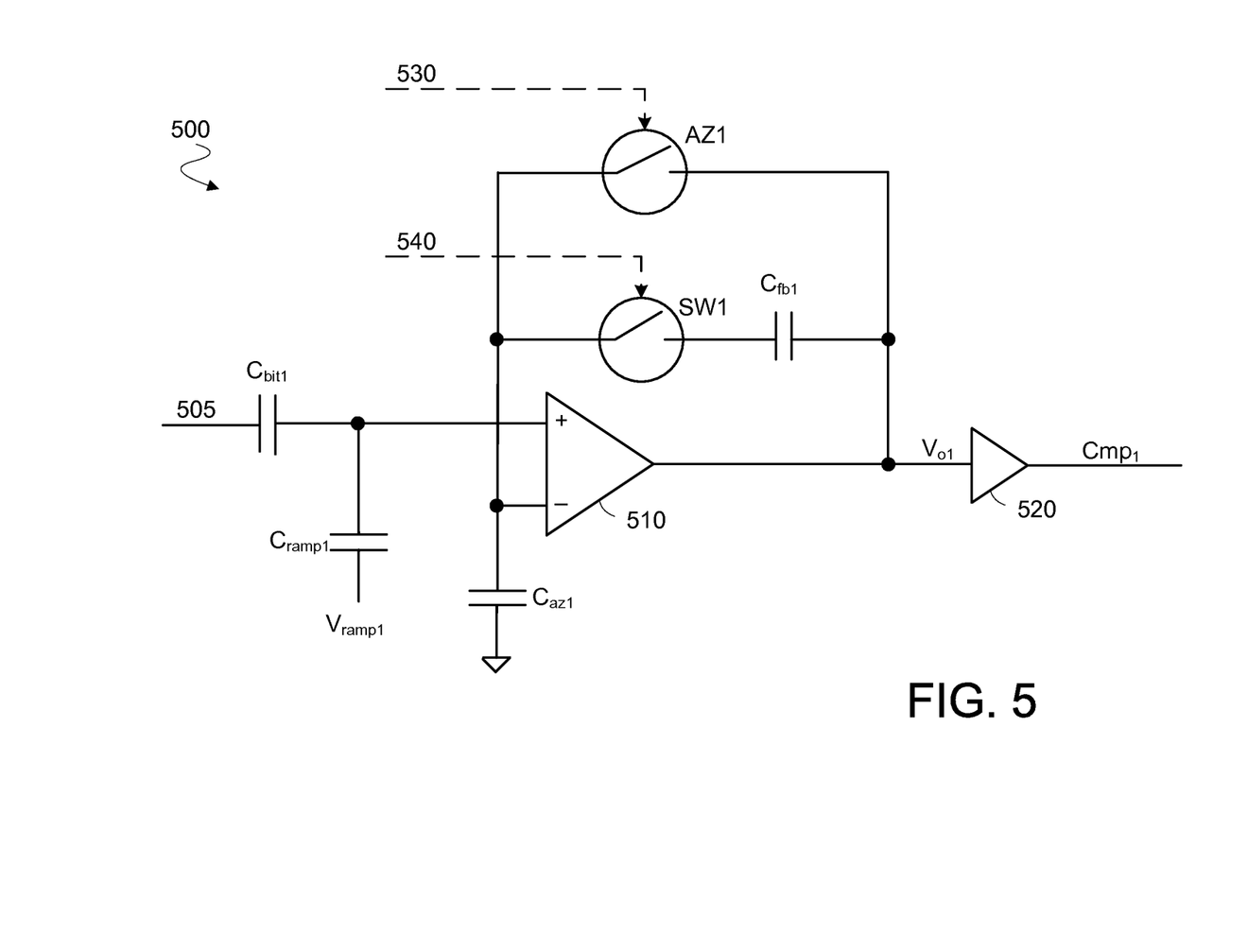
FIG. 5 is a circuit diagram illustrating elements of an analog-to-digital converter of readout circuitry according to an embodiment.

ADC 500 is one example of an ADC comprising a differential amplifier, a feedback path including a first capacitor coupled between an input of the differential amplifier and an output of the differential amplifier, and a second capacitor coupled between the input of the differential amplifier and a node to provide a reference (e.g., ground) potential. More particularly, ADC 500 comprises differential amplifier 510 and a feedback path including capacitor $C_{fb1}$ coupled between an input (e.g., the inverting input) of differential amplifier 510 and an output of differential amplifier 510. ADC 500 further comprises capacitor $C_{az1}$ coupled between the same input of differential amplifier 510 and ground. In some embodiments, the feedback path further comprises a switch, as represented by the illustrative switch SW1 responsive to control signal 540.

The ADC may be adaptive at least insofar as it may be variously configured, based on the control signal, to provide any of two or more possible gain levels. For example, method 400 may further comprise, at 420, configuring a loop gain of the differential amplifier in response to the control signal, including configuring one of the feedback path (e.g., including $C_{fb1}$) and the second capacitor (e.g., $C_{az1}$). The control signal e.g., signal 540 may correspond to a voltage (or other) range of the ramp signal and/or a corresponding voltage (or other) transition rate of the ramp signal. The loop gain configured at 420 may correspond to such a range and/or transition rate of the ramp signal. Configuring the loop gain at 420 may include transitioning the ADC between a configuration providing an open loop gain with the differential amplifier and another configuration providing a closed loop gain with the differential amplifier. For example, configuring the loop gain at 420 may include transitioning switch SW1 between an open state and a closed state in response to the control signal. Alternatively or in addition, configuring the loop gain at 420 may include changing a capacitance of the first capacitor and/or a capacitance of the second capacitor—e.g., in response to the control signal.

Based on the loop gain that is configured at 420 in response to the control signal, method 400 may, at 430, output from the ADC a digital signal representing a comparison based on the analog signal and the ramp signal. In an illustrative scenario for one embodiment, readout circuitry for an image sensor determines that image sensing in a bright lighting condition is indicated. In response, $V_{ramp1}$ may be configured to have a relatively fast rate of change—such as that of $V_{ramp}$(1×) 382 that, for example, is due to a relatively large ramp voltage range. This fast-changing ramp signal may require a relatively high bandwidth of ADC 500. Consequently, certain embodiments dynamically configure a relatively low loop gain with analog differential amplifier 510 e.g., by transitioning SW1 to a closed state with control signal 540, resulting in configuration of a close-loop gain to enable negative feedback.

ADC 500 may further include capacitor $C_{bit1}$ to receive charge based on a signal of analog signal line 505, wherein $C_{ramp1}$ of ADC 500 is to receive charge based on $V_{ramp1}$. Both $C_{bit1}$ and $C_{ramp1}$ may be coupled to a non-inverting input of differential amplifier 510. During a reset stage—e.g., where a bypass switch AZ1 is open—a reset signal from the pixel array may be sampled to bring capacitors $C_{bit1}$, $C_{ramp1}$ to an initial state. An image processing stage is then performed, where switch SW1 may (or may not) be closed—e.g., depending on an intended loop gain to be provided with differential amplifier 510. An imaging signal from the pixel array may then be sampled into capacitors $C_{bit1}$, $C_{ramp1}$ via analog signal line 505 while $V_{ramp1}$ is also sampled into capacitors $C_{bit1}$, $C_{ramp1}$. Consequently, the non-inverting input of differential amplifier 510 is provided a voltage corresponding to a difference (e.g., including a rate of change difference) between the reset signal and image signal concurrently sampled into capacitors $C_{bit1}$, $C_{ramp1}$. This may allow differential amplifier 510 to generate a signal indicating that a current count value of a counter, synchronized with $T_{ramp1}$, is representative of image signal information, and is to be latched to a memory.

In an alternate scenario, an indication of low lighting conditions may result in ADC 500 receiving a relatively slow changing (low rate of change) $V_{ramp}$, such as that of $V_{ramp}(1\times)$ 382. The slow changing ramp signal may allow ADC 500 to be configured instead with a relatively high loop gain, since bandwidth is not a limiting factor now. Accordingly, an open state of SW1 may be configured dynamically by control signal 540 to provide an open loop (relatively high) gain.

In an embodiment, the digital signal output at 430 is an amplified version of an output from the differential amplifier. For example, ADC 500 may further comprise amplifier 520 to receive output $V_{o1}$ generated by differential amplifier 510 based on a signal of analog signal line 505 and $V_{ramp1}$. Amplifier 520 may perform amplification of $V_{o1}$ to generate digital signal $Cmp_1$ representing, for example, a comparison operation based on the signal of analog signal line 505 and $V_{ramp1}$.

In some embodiments, ADC 500 further comprises circuit elements configured to support a bias operation (also referred to as an "auto-zero"). For example, ADC 500 may further comprise a configurable bypass path coupled—in parallel with the feedback path including $C_{fb1}$—between the output of differential amplifier 510 and the input of differential amplifier 510 to which $C_{az1}$ is coupled. Such a bypass path may include a switch AZ1, responsive to another control signal 530, to configure an auto-zero mode of ADC 500. The auto-zero mode may enable a bias of ADC 500 wherein AZ1 is in a closed state. Such biasing may include one or more operations adapted from conventional differential amplifier biasing techniques, which are not limiting on certain embodiments.

In one illustrative embodiment, $C_{bit1}$ is within a range from 150 femtoFarads (fF) to 200 fF, $C_{ramp1}$ is within a range from 150 fF to 200 fF, $C_{az1}$ is within a range from 180 fF to 220 fF and $C_{fb1}$ is within a range from 8 fF to 12 fF. Alternatively or in addition, $V_{ramp1}$ may, during a relatively low (e.g., 1×) gain operation, transition at a rate between 0.08 Volts per microsecond (V/μs) and 1.6 V/μs. However, $V_{ramp1}$ may, during a relatively high (e.g., 8×) gain operation, transition at a rate between 0.01 Volts per microsecond (V/μs) and 0.2 V/μs. In such an illustrative embodiment, $V_{o1}$ may support logic state transitions e.g., to variously transition between a logic high state ("1") and logic low state ("0")—at a frequency in a range from 100 megaHertz (Mhz) to 150 Mhz. However, such parameters indicating operational characteristics of ADC 500 are merely illustrative, and may vary significantly in different embodiments according to implementation specific details.

Figure 6:
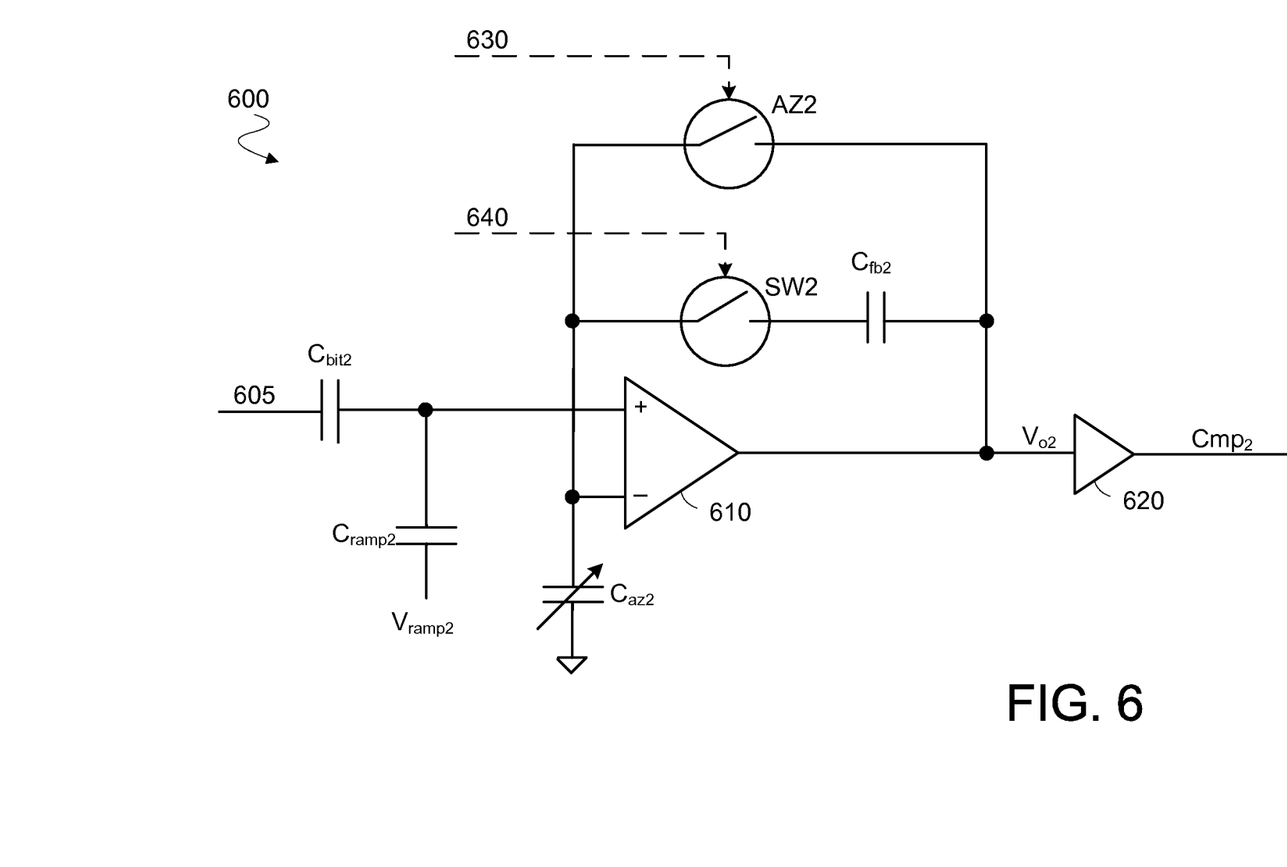
FIG. 6 is a circuit diagram illustrating elements of an analog-to-digital converter of readout circuitry according to an embodiment.

In some embodiments, configuring the loop gain at 420 includes varying a capacitance of the first capacitor and/or a capacitance of the second capacitor in response to the control signal. For example, FIG. 6 illustrates elements of ADC 600 to process an image sensor signal according to another embodiment. ADC 600 may have an architecture similar to that of ADC 500 in some respects e.g., where ADC 600 includes differential amplifier 610 corresponding functionally to differential amplifier 510, and further includes capacitors $C_{bit2}$, $C_{ramp2}$, $C_{az2}$, $C_{fb2}$ corresponding functionally to capacitors $C_{bit1}$, $C_{ramp1}$, $C_{az1}$, $C_{fb1}$, respectively. In some embodiments, ADC 600 further comprises a bypass path including a switch AZ2, responsive to a control signal 630, to enable biasing of ADC 600.

ADC 600 may be coupled to receive a signal via analog signal line 605, ramp signal $V_{ramp2}$ and a control signal (not shown) to configure a loop gain that is provided with differential amplifier 610. In the illustrative embodiment shown, $C_{az2}$ includes a variable capacitor, where the control signal dynamically configures a level of capacitance to be provided by $C_{az2}$ to implement a particular closed loop gain based in part on a feedback path including $C_{az2}$. In some embodiments, $C_{fb2}$ is a variable capacitor as well (or instead), where the same or another control signal is to additionally or alternatively configure a capacitance level of $C_{fb2}$ for the particular closed loop gain. Alternatively or in addition, the loop gain may be dynamically configured at least in part by operation of a switch SW2, with a control signal 640, to transition between an open loop gain and a closed loop gain. Based on the configured loop gain, the signal received via analog signal line 605 and $V_{ramp2}$, differential amplifier 610 may provide an output $V_{o2}$. In some embodiments, ADC 600 further comprises amplifier 620 to output, based on $V_{o2}$, a digital signal $Cmp_2$ representing a comparison performed based on the signal of analog signal line 605 and $V_{ramp2}$. $Cmp_2$ may be provided to signal a latching of a counter (not shown) of readout circuitry that is to include ADC 600. The counter may be configured to perform a count sequence that is synchronized with the beginning and/or the end of a linear transition portion of $V_{ramp2}$.

Techniques and architectures for processing image sensor data are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A circuit comprising:
   a signal generator to output a cyclical signal including a ramp portion, wherein the signal generator is coupled to receive a first control signal and adjust the ramp portion based on the first control signal;
   control logic coupled to provide the first control signal to the signal generator, wherein the first control signal is based on a brightness level of a lighting condition, and wherein the control logic is further coupled to provide a second control signal to an analog-to-digital converter (ADC) based on the brightness level of the lighting condition,
   wherein, based on a bright light condition, the first control signal causes the signal generator to provide the cyclical signal having a fast ramp portion, and the second control signal causes the ADC to have a closed loop gain, and
   wherein, based on a low light condition, the first control signal causes the signal generator to provide the cyclical signal having a slow ramp portion, and the second control signal causes the ADC to have an open loop gain; and
   the ADC coupled to receive the cyclical signal, the ADC further coupled to receive the second control signal and an analog signal, the ADC including:
      a differential amplifier;
      a feedback path including a first capacitor coupled between an input of the differential amplifier and an output of the differential amplifier; and
      a second capacitor coupled between the input of the differential amplifier and a node to provide a reference potential;
   wherein, in response to the second control signal, a loop gain of the differential amplifier is adjusted by the ADC, wherein, in response to the second control signal, the ADC configures one of the feedback path and the second capacitor to adjust the loop gain, and
   wherein the ADC is further coupled to output, based on the loop gain, a digital signal representing a comparison of the analog signal and the cyclical signal.

2. The circuit of claim 1, wherein the ADC receives the analog signal from a pixel array, and wherein the ADC is coupled to the pixel array independent of any column gain amplifier circuit.

3. The circuit of claim 1, wherein the feedback path is a switchable feedback path comprising a switch configured to transition between an open state and a closed state in response to the second control signal.

4. The circuit of claim 1, wherein the ADC to configure the loop gain in response to the second control signal includes the ADC to vary a capacitance of the first capacitor in response to the control signal.

5. The circuit of claim 1, wherein the ADC to configure the loop gain in response to the second control signal includes the ADC to vary a capacitance of the second capacitor in response to the control signal.

6. The circuit of claim 1, the control logic further to synchronize a counter with the cyclical signal.

7. The circuit of claim 6, wherein the digital signal is coupled to latch an output from the counter.

8. The circuit of claim 1, the ADC further comprising a bypass path coupled, in parallel with the feedback path, between the input of the differential amplifier and the output of the differential amplifier, the bypass path including a switch, the ADC further to receive a third control signal and to configure an auto-zero mode in response to the third control signal, the auto-zero mode to enable a bias of the ADC, wherein the ADC to configure the auto-zero mode includes the ADC to transition a switch of the bypass path to a closed state.

9. A method comprising:
   generating a cyclical signal having a ramp portion;
   adjusting a rate of change of the ramp portion based on a brightness level of a lighting condition, wherein based on a low lighting condition, the rate of change is adjusted to be slow, and wherein, based on a high lighting condition, the rate of change is adjusted to be fast;

receiving, at an analog-to-digital converter (ADC) an analog signal, the cyclical signal, a control signal corresponding to the rate of change of the ramp portion, wherein the ADC includes:

a differential amplifier;

a feedback path including a first capacitor coupled between an input of the differential amplifier and an output of the differential amplifier; and a second capacitor coupled between the input of the differential amplifier and a node to provide a reference potential;

configuring a loop gain of the differential amplifier in response to the control signal, including configuring one of the feedback path and the second capacitor, wherein, based on the low lighting condition, the loop gain is a closed loop gain, and wherein, based on the high lighting condition, the loop gain is an open loon gain; and based on the configured loop gain, outputting from the ADC a digital signal representing a comparison based on the analog signal and the cyclical signal.

10. The method of claim 9, wherein the ADC receives the analog signal from a pixel array, the ADC coupled to the pixel array independent of any column gain amplifier circuit.

11. The method of claim 9, further comprising synchronizing a counter with the cyclical signal.

12. The method of claim 11, further comprising latching an output from the counter in response to the digital signal.

13. The method of claim 9, wherein the ADC further comprises a bypass path coupled, in parallel with the feedback path, between the input of the differential amplifier and the output of the differential amplifier, the bypass path including a switch, the method further comprising:

receiving a second control signal; and configuring an auto-zero mode in response to the second control signal, including transitioning the switch of the bypass path to a closed state, wherein the auto-zero mode enables a bias of the ADC.

14. An image sensor system comprising:

a pixel array including a first pixel to generate an analog signal; and readout circuitry coupled to the pixel array, the readout circuitry including:

a signal generator to output a cyclical signal including a ramp portion, wherein the signal generator is coupled to receive a first control signal and adjust the ramp portion based on the first control signal;

control logic coupled to provide the first control signal to the signal generator, wherein the first control signal is based on a brightness level of a lighting condition, and wherein the control logic is further coupled to provide a second control signal to an analog-to-digital converter (ADC) based on the brightness level of the lighting condition, wherein, based on a bright light condition, the first control signal causes the signal generator to provide the cyclical signal having a fast ramp portion, and the second control signal causes the ADC to have a closed loop gain, and wherein, based on a low light condition, the first control signal causes the signal generator to provide the cyclical signal having a slow ramp portion, and the second control signal causes the ADC to have an open loop gain; and the ADC coupled to receive the cyclical signal, and further coupled to receive the second control signal and the analog signal, the ADC including:

a differential amplifier;

a feedback path including a first capacitor coupled between an input of the differential amplifier and an output of the differential amplifier; and a second capacitor coupled between the input of the differential amplifier and a node to provide a reference potential;

wherein, in response to the second control signal, a loop gain of the differential is adjusted by the ADC, wherein, in response to the second control signal, the ADC configures one of the feedback path and the second capacitor to adjust the loop gain, and wherein the ADC is further coupled to output, based on the loop gain, a digital signal representing a comparison of the analog signal and the cyclical signal.

15. The image sensor system of claim 14, wherein the ADC is coupled to receive the analog signal from the pixel array, and wherein the ADC is coupled to the pixel array independent of any column gain amplifier circuit.

16. The image sensor system of claim 14, the readout circuitry further comprising a counter, the control logic further to synchronize the counter with the cyclical signal.

17. The image sensor system of claim 14, the ADC further comprising a bypass path coupled, in parallel with the feedback path, between the input of the differential amplifier and the output of the differential amplifier, the bypass path including a switch, the ADC further to receive a third control signal and to configure an auto-zero mode in response to the third control signal, the auto-zero mode to enable a bias of the ADC, wherein the ADC to configure the auto-zero mode includes the ADC to transition a switch of the bypass path to a closed state.

* * * * *